US012154067B1

(12) United States Patent
Rakshit et al.

(10) Patent No.: US 12,154,067 B1
(45) Date of Patent: Nov. 26, 2024

(54) MANAGEMENT OF UNATTENDED PACKAGE DELIVERY

(71) Applicant: International Business Machines Corporation, Armonk, NY (US)

(72) Inventors: Sarbajit K. Rakshit, Kolkata (IN); Raghuveer Prasad Nagar, Kota (IN); Reji Jose, Bangalore (IN); Sidharth Ullal, Chennai (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 18/459,765

(22) Filed: Sep. 1, 2023

(51) Int. Cl.
*G06Q 10/083* (2024.01)

(52) U.S. Cl.
CPC .................................. *G06Q 10/083* (2013.01)

(58) Field of Classification Search
CPC .................................................... G06Q 10/083
USPC .......................................................... 705/330
See application file for complete search history.

(56) References Cited

U.S. PATENT DOCUMENTS 10,163,177 B2 12/2018 Farris
11,513,538 B1 * 11/2022 Kaneria ................... B64D 9/00
2018/0092484 A1 4/2018 Lewis
2018/0365645 A1 12/2018 Gillen
2020/0034787 A1 * 1/2020 Phillips .................. G06N 20/00
2022/0083964 A1 * 3/2022 Silverstein ......... G06Q 30/0282
2023/0017144 A1 1/2023 Emacha
2023/0069834 A1 3/2023 Rakshit
2023/0090303 A1 3/2023 Morris

FOREIGN PATENT DOCUMENTS

CN 110705944 A 1/2020

OTHER PUBLICATIONS

"Evaluating package delivery crowdsourcing using location traces in different population densities" Published by Elsevier (Year: 2022).*

Hambling, David, "How Active Camouflage Will Make Small Drones Invisible", Popular Mechanics, Nov. 14, 2015, 3 Pages.

* cited by examiner

*Primary Examiner* — Zeina Elchanti
(74) *Attorney, Agent, or Firm* — Anthony M. Pallone

(57) ABSTRACT

In an approach to automated protection of delivered packages, a computer receives information associated with a package delivery. A computer determines a recipient is not present for the package delivery. A computer predicts a time of arrival of the recipient. A computer determines a duration of time prior to the arrival of the recipient exceeds a pre-defined threshold. A computer determines one or more environmental conditions of an area surrounding a delivery location. A computer determines at least one of the one or more environmental conditions indicates a need for an ameliorative action associated with the package delivery. A computer determines one or more ameliorative actions. A computer instructs a delivery resource to perform the one or more ameliorative actions. A computer instructs the delivery resource to deliver the package.

20 Claims, 3 Drawing Sheets

106
START
RECEIVE PACKAGE DELIVERY INFORMATION 202
RECIPIENT PRESENT FOR DELIVERY? 204 (YES / NO)
PREDICT TIME OF RECIPIENT ARRIVAL 206
TIME EXCEED PRE-DEFINED THRESHOLD? 208 (NO / YES)
DETERMINE ENVIRONMENTAL CONDITIONS 210
CONDITIONS INDICATE AMELIORATIVE ACTION NEEDED? 212 (NO / YES)
DETERMINE APPROPRIATE AMELIORATIVE ACTION 214
PERFORM AMELIORATIVE ACTION 216
DELIVER PACKAGE 218
CAPTURE IMAGE OF PACKAGE 220
REQUEST FEEDBACK 222
RECEIVE FEEDBACK 224
STORE FEEDBACK 226
END

MANAGEMENT OF UNATTENDED PACKAGE DELIVERY

BACKGROUND OF THE INVENTION

The present invention relates generally to the field of delivery of goods and materials, and more particularly to automated protection of delivered packages.

Delivery services (also known as courier services, mail services, and shipping services), such as those offered by national postal services and commercial carriers, provide delivery of letters, packages, and parcels to and from residences and businesses across the United States and other countries. Other delivery services may be provided by merchants, retailers, manufacturers, or other organizations that desire to deliver products to users.

The Internet of Things (IoT) is the inter-networking of physical devices (also referred to as "connected devices" and "smart devices"), vehicles, buildings, and other items, embedded with electronics, software, sensors, actuators, and network connectivity that enable these objects to collect and exchange data. The IoT allows objects to be sensed and/or controlled remotely across existing network infrastructure, creating opportunities for more direct integration of the physical world into computer-based systems, and resulting in improved efficiency, accuracy, and economic benefit in addition to reduced human intervention. Each "thing" is uniquely identifiable through its embedded computing system but is able to interoperate within the existing Internet infrastructure.

SUMMARY

Embodiments of the present invention disclose a computer-implemented method, a computer program product, and a system for automated protection of delivered packages. The computer-implemented method may include one or more computer processors receiving information associated with a package delivery. One or more computer processors determine a recipient is not present for the package delivery. One or more computer processors predict a time of arrival of the recipient. One or more computer processors determine a duration of time prior to the arrival of the recipient exceeds a pre-defined threshold. One or more computer processors determine one or more environmental conditions of an area surrounding a delivery location. One or more computer processors determine at least one of the one or more environmental conditions indicates a need for an ameliorative action associated with the package delivery. One or more computer processors determine one or more ameliorative actions. One or more computer processors instruct a delivery resource to perform the one or more ameliorative actions. One or more computer processors instruct the delivery resource to deliver the package.

DETAILED DESCRIPTION

When package delivery is made to an unattended location, such as a house, a backyard, a garden, an office, a store, or a porch, there is a risk of the package being stolen. There is also a risk of the package being damaged or destroyed by various environmental factors, such as weather or animals in the area. In another scenario, a package recipient may have scheduled a delivery for a specific day and time, and then is unexpectedly unavailable at that time, thus, preventing the delivery, potentially causing overhead to the delivery service for return/re-ship/replanning the delivery. These scenarios can provide disappointment and/or frustration to the package recipient as well as cost to the delivery service and the entity that originally shipped the package. Embodiments of the present invention recognize that delivery services may be improved by providing a system which, when a package recipient is not present to receive the package, can manage the package delivery to reduce the likelihood of the package being stolen or damaged. Embodiments of the present invention also recognize that improvements to delivery services may be made by using the Internet of Things (IoT) to detect environmental conditions that indicate ameliorative actions are needed to protect the package. Implementation of embodiments of the invention may take a variety of forms, and exemplary implementation details are discussed subsequently with reference to the Figures.

Figure 1:
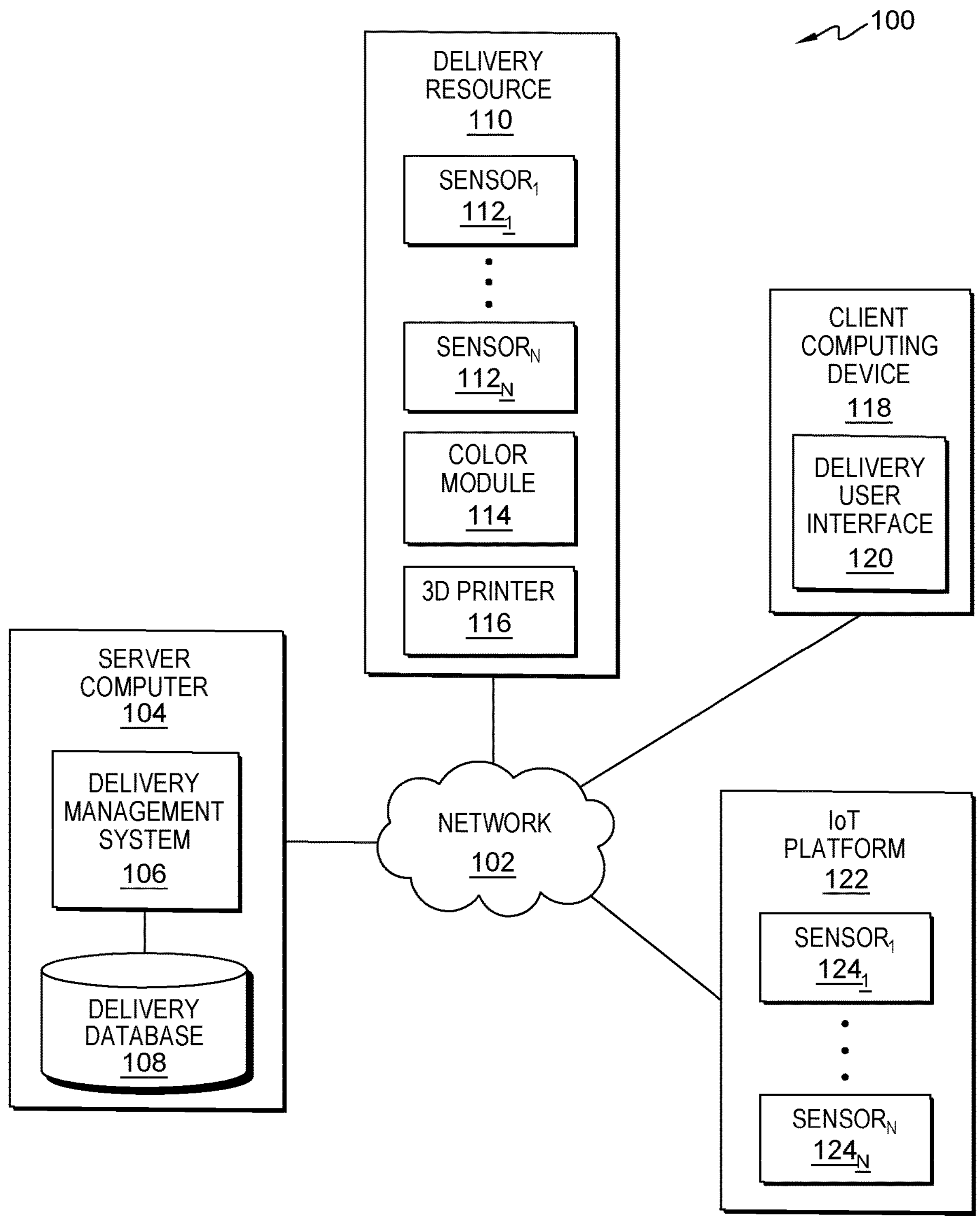
FIG. 1 is a functional block diagram illustrating a distributed data processing environment, in accordance with an embodiment of the present invention.

FIG. 1 is a functional block diagram illustrating a distributed data processing environment, generally designated 100, in accordance with one embodiment of the present invention. The term "distributed" as used herein describes a computer system that includes multiple, physically distinct devices that operate together as a single computer system. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Distributed data processing environment 100 includes server computer 104, delivery resource 110, client computing device 118, and Internet of Things (IoT) platform 122, all interconnected over network 102. Network 102 can be, for example, a telecommunications network, a local area network (LAN), a wide area network (WAN), such as the Internet, or a combination of the three, and can include wired, wireless, or fiber optic connections. Network 102 can include one or more wired and/or wireless networks capable of receiving and transmitting data, voice, and/or video signals, including multimedia signals that include voice, data, and video information. In general, network 102 can be any combination of connections and protocols that will support communications between server computer 104, delivery resource 110, client computing device 118, IoT platform 122, and other computing devices (not shown) within distributed data processing environment 100. Distributed data processing environment 100 may be implemented in computing environment 300 shown in FIG. 3.

Server computer 104 can be a standalone computing device, a management server, a web server, a mobile computing device, or any other electronic device or computing system capable of receiving, sending, and processing data. In other embodiments, server computer 104 can represent a server computing system utilizing multiple computers as a server system, such as in a cloud computing environment. In another embodiment, server computer 104 can be a laptop computer, a tablet computer, a netbook computer, a personal computer (PC), a desktop computer, a personal digital assistant (PDA), a smart phone, an edge device, a containerized workload, or any programmable electronic device capable of communicating with delivery resource 110, client computing device 118, IoT platform 122, and other computing devices (not shown) within distributed data processing environment 100 via network 102. In another embodiment, server computer 104 represents a computing system utilizing clustered computers and components (e.g., database server computers, application server computers, etc.) that act as a single pool of seamless resources when accessed within distributed data processing environment 100. Server computer 104 includes delivery management system 106 and delivery database 108. Server computer 104 may include internal and external hardware components, as depicted and described in further detail with respect to computer 301 of FIG. 3.

Delivery management system 106 provides a method to predict the impact of the surrounding and environment of a location where a package will be delivered without the presence of a recipient. Based on the delivery location and packaging details, delivery management system 106 determines one or more ameliorative actions and performs the actions to protect the package. Delivery management system 106 receives package delivery information. Delivery management system 106 determines whether the recipient will be present for the delivery. If delivery management system 106 determines the recipient will not be present, then delivery management system 106 predicts the time of arrival of the recipient. If delivery management system 106 determines the duration of time before the recipient arrives exceeds a pre-defined threshold, then delivery management system 106 determines the environmental conditions. If delivery management system 106 determines the environmental conditions indicate a need for ameliorative action, then delivery management system 106 determines an appropriate ameliorative action. Delivery management system 106 performs the ameliorative action. Responsive to performing the ameliorative action, or if delivery management system 106 determines the recipient is present for the delivery, or if delivery management system 106 determines the predicted time of the recipient arrival does not exceed the pre-defined threshold, or if delivery management system 106 determines the environmental conditions do not indicate a need for ameliorative action, then delivery management system 106 delivers the package. Delivery management system 106 captures an image of the package. Delivery management system 106 requests feedback on the delivery. Delivery management system 106 receives feedback and stores the feedback. Delivery management system 106 is depicted and described in further detail with respect to FIG. 2.

It should be noted herein that in the described embodiments, participating parties have consented to being recorded and monitored, and participating parties are aware of the potential that such recording and monitoring may be taking place. In various embodiments, for example, when downloading or operating an embodiment of the present invention, the embodiment of the invention presents a terms and conditions prompt enabling the user to opt-in or opt-out of participation. Similarly, in various embodiments, emails and texts begin with a written notification that the user's information may be recorded or monitored and may be saved, for the purpose of automated protection of delivered packages. These embodiments may also include periodic reminders of such recording and monitoring throughout the course of any such use. Certain embodiments may also include regular (e.g., daily, weekly, monthly) reminders to the participating parties that they have consented to being recorded and monitored for automated protection of delivered packages and may provide the participating parties with the opportunity to opt-out of such recording and monitoring if desired. Furthermore, to the extent that any non-participating parties' actions are monitored (for example, when outside vehicles are viewed), such monitoring takes place for the limited purpose of providing navigation assistance to a participating party, with protections in place to prevent the unauthorized use or disclosure of any data for which an individual might have a certain expectation of privacy.

In the depicted embodiment, delivery database 108 resides on server computer 104. In another embodiment, delivery database 108 may reside elsewhere within distributed data processing environment 100, provided that delivery management system 106 has access to delivery database 108, via network 102. A database is an organized collection of data. Delivery database 108 can be implemented with any type of storage device capable of storing data and configuration files that can be accessed and utilized by delivery management system 106 such as a database server, a hard disk drive, or a flash memory. Delivery database 108 stores information used by and generated by delivery management system 106. Data delivery database 108 stores a corpus of information from which delivery management system 106 learns and improves performance. For example, delivery database 108 stores feedback from the package recipient in the knowledge corpus. In another example, delivery database 108 stores data feed from IoT platform 122 that shows how a painted object can be hidden in an area surrounding the object. In addition, delivery database 108 also stores a user profile associated with the user of client computing device 118. The user profile may include, but is not limited to, name, address, phone number, email address, an account number, an employer, a job role, a job family, a business unit association, a job seniority, a job level, a resume, a medical record, a social network affiliation, etc. The user profile may also include user preferences, such as a preferred delivery location, a pre-defined threshold duration for a delivered package to be unattended before performing ameliorative actions, preferred ameliorative actions, such as painting or otherwise hiding a package, etc. The user profile may also include a declaration of consent by the user for delivery management system 106 to instruct delivery resource 110 to perform one or more ameliorative actions. Delivery database 108 also stores information and data/metadata associated with a delivered package. For example, delivery database 108 stores one or more of dimensions of the package, volume of the package, weight of the package, value of the package, contents of the package, whether the package is insured, etc.

The present invention may contain various accessible data sources, such as delivery database 108, that may include personal data, content, or information the user wishes not to be processed. Personal data includes personally identifying information or sensitive personal information as well as user information, such as tracking or geolocation information. Processing refers to any operation, automated or unautomated, or set of operations such as collecting, recording, organizing, structuring, storing, adapting, altering, retrieving, consulting, using, disclosing by transmission, dissemination, or otherwise making available, combining, restricting, erasing, or destroying personal data. Delivery management system 106 enables the authorized and secure processing of personal data. Delivery management system 106 provides informed consent, with notice of the collection of personal data, allowing the user to opt in or opt out of processing personal data. Consent can take several forms. Opt-in consent can impose on the user to take an affirmative action before personal data is processed. Alternatively, opt-out consent can impose on the user to take an affirmative action to prevent the processing of personal data before personal data is processed. Delivery management system 106 provides information regarding personal data and the nature (e.g., type, scope, purpose, duration, etc.) of the processing. Delivery management system 106 provides the user with copies of stored personal data. Delivery management system 106 allows the correction or completion of incorrect or incomplete personal data. Delivery management system 106 allows the immediate deletion of personal data.

Delivery resource 110 is a vehicle used to deliver packages. As used herein, the term "package" refers to any type of parcel, letter, envelope, box, etc. that contains an item delivered to a recipient. Delivery resource 110 can be any type of vehicle that can deliver packages and accommodate the use of color module 114 and 3D printer 116. Delivery resource 110 also includes the capability of any programmable electronic device or combination of programmable electronic devices capable of executing machine readable program instructions and communicating with other computing devices via a network, such as network 102. Delivery resource 110 may also include systems for communication, for example, Bluetooth, and navigation, for example, a global positioning system (GPS), as well as additional mapping and object recognition systems (not shown). Delivery resource 110 includes sensor $\mathbf{112}_{1\text{-}N}$, color module 114, and 3D printer 116.

Color module 114 enables painting of packages to enable delivery resource 110 to make the packages less noticeable in the location where delivery management system 106 determines the package is to be delivered. Color module 114 may include a plurality of paint colors in paint cartridges. Color module 114 may include one or more spray nozzles for distributing paint on a package.

3D printer 116 enables 3D printing of objects to be used for ameliorative actions when delivering packages. 3D printing or additive manufacturing is the construction of a three-dimensional object from a computer aided design (CAD) model or a digital 3D model. 3D printing can be done in a variety of processes in which 3D printer 116 deposits, joins, or solidifies material under computer control, with material being added together (such as plastics, liquids or powder grains being fused), typically layer by layer. 3D printer 116 includes a plurality of 3D printing materials.

Client computing device 118 can be one or more of a laptop computer, a tablet computer, a smart phone, smart watch, a smart speaker, or any programmable electronic device capable of communicating with various components and devices within distributed data processing environment 100, via network 102. Client computing device 118 may be a wearable computer. Wearable computers are miniature electronic devices that may be worn by the bearer under, with, or on top of clothing, as well as in or connected to glasses, hats, or other accessories. Wearable computers are especially useful for applications that require more complex computational support than merely hardware coded logics. In one embodiment, the wearable computer may be in the form of a head mounted display. The head mounted display may take the form-factor of a pair of glasses. In an embodiment, the wearable computer may be in the form of a smart watch or a smart tattoo. In an embodiment, client computing device 118 may be integrated into a vehicle. For example, client computing device 118 may be a heads-up display in the windshield of the vehicle. In an embodiment where client computing device 118 is integrated into the vehicle, client computing device 118 includes a programmable, embedded Subscriber Identity Module (eSIM) card (not shown) that includes a unique identifier of the vehicle in addition to other vehicle information. In general, client computing device 118 represents one or more programmable electronic devices or combination of programmable electronic devices capable of executing machine readable program instructions and communicating with other computing devices (not shown) within distributed data processing environment 100 via a network, such as network 102. Client computing device 118 includes an instance of delivery user interface 120.

Delivery user interface 120 provides an interface between delivery management system 106 on server computer 104 and a user of client computing device 118, i.e., the package recipient. In one embodiment, delivery user interface 120 is mobile application software. Mobile application software, or an "app," is a computer program designed to run on smart phones, tablet computers and other mobile devices. In one embodiment, delivery user interface 120 may be a graphical user interface (GUI) or a web user interface (WUI) and can display text, documents, web browser windows, user options, application interfaces, and instructions for operation, and include the information (such as graphic, text, and sound) that a program presents to a user and the control sequences the user employs to control the program. In an embodiment, delivery user interface 120 enables a user of client computing device 118 to input data to be used by delivery management system 106, such as user profile information, preferences, feedback associated with the delivery process, security level of a delivery location, consent and/or approval of recommended ameliorative actions, etc. Delivery user interface 120 also enables a user of client computing device 118 to receive information and notifications from delivery management system 106.

IoT platform 122 is a suite of components that enable a) deployment of applications that monitor, manage, and control connected devices and sensors; b) remote data collection from connected devices; and c) independent and secure connectivity between devices. The suite of components may include, but are not limited to, a hardware architecture, an operating system, a runtime library, an edge device, and/or a containerized workload (not shown). In the depicted embodiment, IoT platform 122 includes sensor $\mathbf{124}_{1\text{-}N}$. In another embodiment, IoT platform 122 may include a plurality of other computing devices.

A sensor is a device that detects or measures a physical property and then records or otherwise responds to that property, such as vibration, chemicals, radio frequencies, environment, weather, humidity, light, etc. Sensor $\mathbf{112}_{1\text{-}N}$ and sensor $\mathbf{124}_{1\text{-}N}$, herein sensor(s) 112 and sensor(s) 124, detect a plurality of attributes of delivery resource 110 and IoT platform 122, respectively. As used herein, N represents a positive integer, and accordingly the number of scenarios implemented in a given embodiment of the present invention is not limited to those depicted in FIG. 1. In an embodiment, sensor(s) 112 and sensor(s) 124 detect a plurality of attributes of delivery resource 110 and the environment surrounding the delivery resource 110. Sensor(s) 112 and sensor(s) 124 may be one or more of a plurality of types of cameras, including, but not limited to, pinhole, stereo, omni-directional, non-central, infrared, video, digital, three dimensional, panoramic, filter-based, wide-field, narrow-field, telescopic, microscopic, etc. In some embodiments, sensor(s) 112 and sensor(s) 124 include any device capable of imaging a portion of the electromagnetic spectrum. Sensor(s) 112 and sensor(s) 124 may be one or more of a plurality of types of microphones for detecting speech and other audible sounds. Sensor(s) 112 and sensor(s) 124 may be able to detect weather conditions, such as air temperature, relative humidity, presence and type of precipitation, wind speed, etc. Sensor(s) 112 and sensor(s) 124 may be global positioning system (GPS) sensors. For example, sensor(s) 112 may use GPS to detect the location of the package delivery. Sensor(s) 112 and sensor(s) 124 may include various types of pressure sensors and/or strain gauges to detect a weight of a package or of an object to use to anchor a package in place. Sensor(s) 112 and sensor(s) 124 may include a plurality of sensors such as a laser sensor configured to measure the distance between objects, an altimeter to measure altitude, a gyroscope (e.g., to measure movement changes), and a compass or other indicator of magnetic field which can be used, for example, for navigation and/or measuring magnetic field variability in geology.

Figure 2:
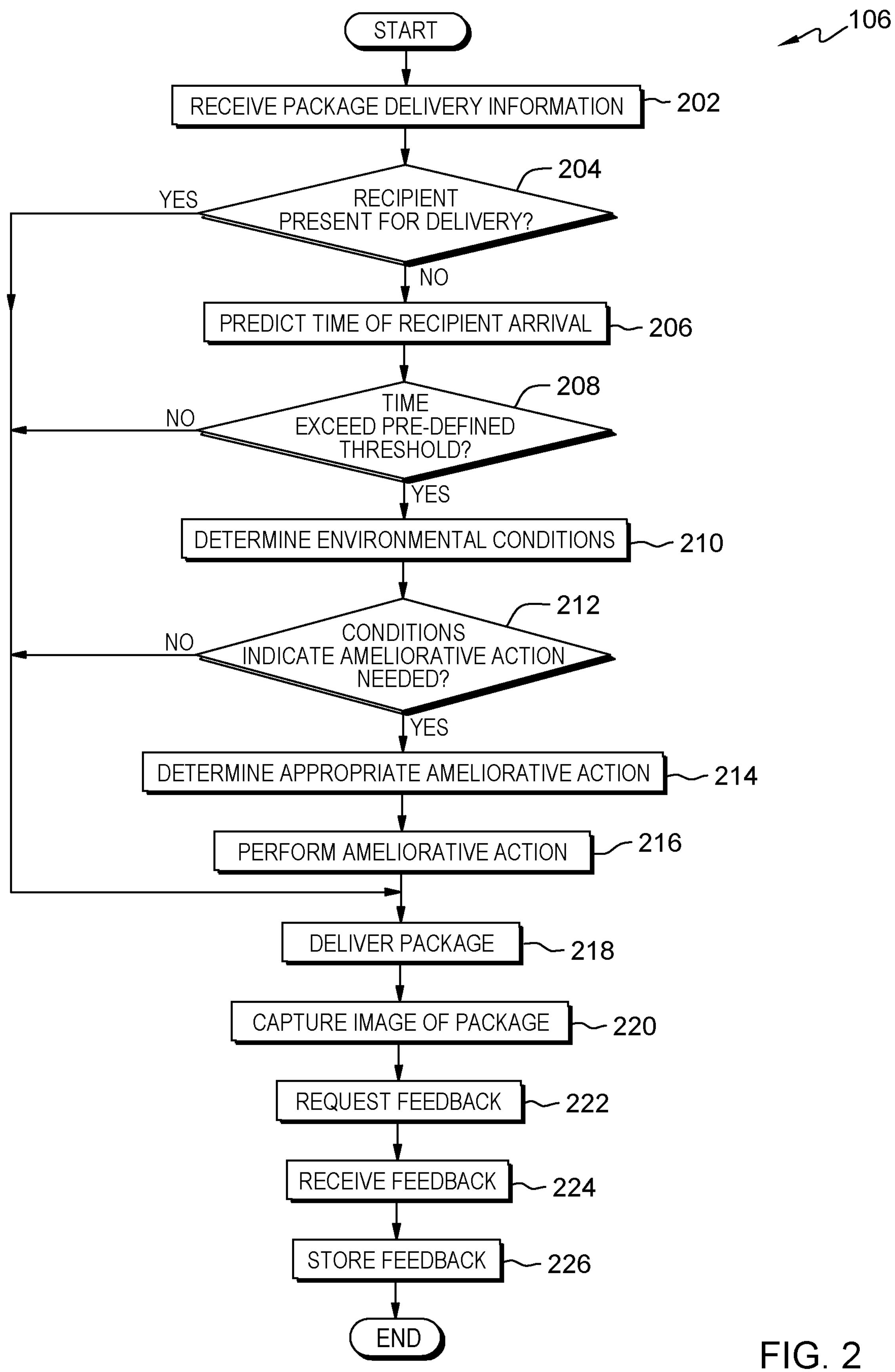
FIG. 2 is a flowchart depicting operational steps of a delivery management system, on a server computer within the distributed data processing environment of FIG. 1, for automated protection of delivered packages, in accordance with an embodiment of the present invention.

FIG. 2 is a flowchart depicting operational steps of delivery management system 106, on server computer 104 within distributed data processing environment 100 of FIG. 1, for automated protection of delivered packages, in accordance with an embodiment of the present invention.

Delivery management system 106 receives package delivery information (step 202). In an embodiment, delivery management system 106 receives data and/or metadata regarding the recipient of a package from a delivery service. For example, the data and/or metadata may include the name of the package recipient, the address of the package recipient, a preferred time of day for delivery, etc. In an embodiment, delivery management system 106 retrieves package delivery information from delivery database 108. For example, delivery management system 106 retrieves a user profile of the package recipient which includes user information and preferences. In another embodiment, delivery management system 106 receives information about the package itself from a delivery service. For example, delivery management system 106 may receive the package dimensions, such as size, shape, and weight, value, contents, whether the package is insured for damage and/or loss, etc. In an embodiment, delivery management system 106 retrieves package information from delivery database 108.

Delivery management system 106 determines whether the recipient will be present for the delivery (decision block 204). In an embodiment, delivery management system 106 determines whether the package recipient is present at the time of delivery in a conventional manner. For example, delivery resource 110 may initiate a doorbell, buzzer, knocking, etc., to alert the recipient that the package is being delivered, and delivery resource 110 transmits the result of the alert to delivery management system 106 via one or more of sensor(s) 112, such as a camera or a microphone. In another embodiment, delivery management system 106 predicts whether the recipient will be present for the delivery by retrieving data from one or more sources of information associated with the recipient. For example, delivery management system 106 may analyze the calendar of the recipient to determine whether the recipient is scheduled to be away. In another example, delivery management system 106 determines the location of client computing device 118 via a global positioning service (GPS) sensor integrated into client computing device 118 (not shown).

If delivery management system 106 determines the recipient will not be present for the delivery ("no" branch, decision block 204), then delivery management system 106 predicts the time of arrival of the recipient (step 206). In an embodiment, delivery management system 106 predicts a duration of time after which the recipient will be present to accept the delivery by retrieving data from one or more sources of information associated with the recipient. For example, as discussed with respect to decision block 204, delivery management system 106 may analyze the calendar of the recipient to determine any appointments or meetings the recipient has scheduled. In another example, delivery management system 106 determines the location of client computing device 118 via a global positioning service (GPS) sensor integrated into client computing device 118 (not shown) and determines the length of time required for the recipient to travel from the current location to the location of the package delivery. In a further example, delivery management system 106 may review social media data associated with the recipient to determine when the recipient will arrive. In yet another example, delivery management system 106 may analyze one or more of emails, text messages, and phone calls of the recipient using one or more natural language processing (NLP) techniques to determine when the recipient will arrive. In another example, using a machine learning algorithm, delivery management system 106 may analyze historical travel patterns of the recipient to predict when the recipient will arrive at the delivery location.

Delivery management system 106 determines whether the duration of time prior to arrival exceeds a pre-defined threshold (decision block 208). In an embodiment, delivery management system 106 compares the determined duration of time until the recipient arrives at the delivery location to a pre-defined threshold of time to determine whether the predicted duration exceeds the pre-defined threshold. In an embodiment, delivery management system 106 retrieves the pre-defined threshold from delivery database 108. In an embodiment, the user of client computing device 118, i.e., the recipient, defines an acceptable threshold of time for a package delivery to be unattended, and stores the defined threshold in delivery database 108. In another embodiment, a system administrator of the delivery service defines a threshold time duration for a package delivery to remain unattended. In an embodiment, a plurality of time duration thresholds are defined based on the package delivery information of the package. For example, if the content of the package is perishable, then the time duration threshold may be shorter than if the content of the package was non-perishable.

If the predicted duration of time prior to arrival exceeds a pre-defined threshold ("yes" branch, decision block 208), then delivery management system 106 determines environmental conditions (step 210). In an embodiment, in response to determining the package will be unattended for greater than a threshold duration of time following the delivery, delivery management system 106 receives data from sensor(s) 112 and/or sensor(s) 124 to determine one or more environmental conditions that may affect the delivery of the package. In an embodiment, the environmental conditions include weather conditions. For example, if data from sensor(s) 112 and/or sensor(s) 124 indicate rain, either currently or during the time before the recipient arrives, then delivering the package to an uncovered location may result in damage to the package. In another example, if data from sensor(s) 112 and/or sensor(s) 124 indicate wind, either currently or during the time before the recipient arrives, then delivering a lightweight package to an unsecured location may result in damage to or loss of the package. In yet another example, if data from sensor(s) 112 and/or sensor(s) 124 indicate a dust storm, either currently or during the time before the recipient arrives, then delivering a package containing food to an unprotected location may result in contamination of the food. In yet another example, if data from sensor(s) 112 and/or sensor(s) 124 indicate an extreme temperature, either currently or during the time before the recipient arrives, then delivering the package to an unshaded location may result in damage to the package. In an embodiment, in addition to or instead of receiving weather conditions from sensor(s) 112 and/or sensor(s) 124, delivery management system 106 retrieves weather data from a publicly available system and/or database, such as a weather prediction system.

In an embodiment, the environmental conditions include other conditions in the delivery location. For example, data from sensor(s) 112 and/or sensor(s) 124 may indicate a smell or chemical presence that may be detrimental to the package. In another example, data from sensor(s) 112 and/or sensor(s) 124 may indicate that the delivery location is not stable enough to support the package, and the structure may collapse under the weight of the package, or the package may slide off an inclined structure. In another embodiment, environmental conditions may include an indication of the security of the package in the location. For example, data from sensor(s) 112 and/or sensor(s) 124, such as images from a camera or closed-circuit television (CCTV), indicate that the delivery location is not lockable, e.g., there is no dedicated drop box, and would not prevent unauthorized receipt of the package. In another example, data from sensor(s) 112 and/or sensor(s) 124 indicate that the delivery location is not well lit or the sound of sirens is present. In an embodiment, delivery management system 106 retrieves historical security data from a public database (not shown) or a private database (not shown, used with permission) to determine a level of security in the location. In another embodiment, delivery management system 106 receives input from the recipient, via delivery user interface 120, that indicates the security level of the location.

Delivery management system 106 determines whether the environmental conditions indicate a need for ameliorative action (decision block 212). In an embodiment, based on the current and/or predicted environmental conditions, as well as the package delivery information, delivery management system 106 determines whether one or more ameliorative actions are needed, where, as used herein, an ameliorative action provides protection of the package until the recipient arrives. For example, as discussed with respect to step 210, delivery management system 106 determines any weather conditions that will adversely affect the package if an ameliorative action is not taken. In another example, delivery management system 106 determines conditions such as a chemical smell or instability of a support structure will adversely affect the package if an ameliorative action is not taken. In a further example, delivery management system 106 determines the security of the package is inadequate to protect the package during the time until the recipient arrives.

If delivery management system 106 determines the environmental conditions indicate a need for ameliorative action ("yes" branch, decision block 212), then delivery management system 106 determines an appropriate ameliorative action (step 214). In an embodiment, based on the package delivery information, the predicted time of the arrival of the recipient, and the current and/or predicted environmental conditions, delivery management system 106 determines one or more ameliorative actions to perform to protect the package upon delivery.

In an embodiment where delivery management system 106 determines one or more weather conditions will adversely affect the package, delivery management system 106 determines an ameliorative action associated with a specific weather condition. In an embodiment where rain is present, delivery management system 106 can instruct delivery resource 110 to deliver the package to a different location where the package will be under cover and notify the recipient, via delivery user interface 120, of the location of the package. In another embodiment, delivery management system 106 instructs delivery resource 110 to use 3D printer 116 to print a shelter to place over the package. In an embodiment where strong wind is present and the package is not heavy enough to withstand the wind and remain in the delivery location, delivery management system 106 instructs delivery resource 110 to move a heavy object from the surrounding area and put the heavy object on top of the package to hold the package in place. In another embodiment, delivery management system 106 instructs delivery resource 110 to use 3D printer 116 to print an object that can be used as a weight on the package, and then delivery management system 106 instructs delivery resource 110 to place the printed weight on the package.

In an embodiment where delivery management system 106 determines the support structure of the delivery location is such that the package may slide off, e.g., an inclined surface, delivery management system 106 instructs delivery resource 110 to use 3D printer 116 to print one or more objects, straps, or locks to position on one or more sides of the package such that the package does not slide off the support structure. In an embodiment where delivery management system 106 determines the support structure of the delivery location does not have a stable base, delivery management system 106 instructs delivery resource 110 to use 3D printer 116 to print a bowl-like platform for the package to provide stability.

In an embodiment where delivery management system 106 determines the security of the package is inadequate, delivery management system 106 analyzes the surrounding area where the package is located to determine one or more colors to paint the package that will hide, i.e., camouflage, the package in the surrounding area. In an embodiment, delivery management system 106 uses one or more cameras of sensor(s) 112 and/or sensor(s) 124 to capture an image of the surrounding area for analysis. Using color module 114, delivery management system 106 instructs delivery resource 110 to paint the package such that the package blends in with the surrounding area, making recognition of an unattended package in the location difficult, and therefore improving the security of the delivered package. In an embodiment, delivery management system 106 uses a classification algorithm and/or model to classify a color captured by the one or more cameras of sensor(s) 112 and/or sensor(s) 124 to the closest color available in color module 114 for painting the package. In an embodiment, delivery management system 106 builds the classification model over time by analyzing various images, photographs, videos, etc., captured by the one or more cameras of sensor(s) 112 and/or sensor(s) 124 to learn how the combination of colors can camouflage a package in its surrounding area. In an embodiment, in addition to data captured by the one or more cameras of sensor(s) 112 and/or sensor(s) 124, delivery management system 106 may also receive input from the recipient, via delivery user interface 120. Based on the historical learning, delivery management system 106 creates and/or augments the knowledge corpus stored in delivery database 108 for identifying the best mode of painting the package.

In an embodiment where multiple packages are included in the delivery, delivery management system 106 determines a distinguishable variation in the colors used to camouflage each package such that the packages are more easily distinguished.

In an embodiment, delivery management system 106 requests consent from the recipient to paint the package and leave it in the designated location. For example, delivery management system 106 transmits a message to the recipient via delivery user interface 120, requesting approval of the painting and delivery of the package. In another embodiment, the recipient provides prior approval via a preference stored in delivery database 108, and delivery management system 106 retrieves the approval from delivery database 108.

In another embodiment where delivery management system 106 determines the security of the package is inadequate, delivery management system 106 analyzes the surrounding area, via images captured by sensor(s) 112 and/or sensor(s) 124, to determine whether there is an area where delivery resource 110 can place the package such that the package is hidden, i.e., out of view. In the embodiment, delivery management system 106 considers the dimensions and/or volume of the package in order to determine an appropriate location to hide the package.

In yet another embodiment where one or more environmental conditions indicate a need for ameliorative action, delivery management system 106 may instruct delivery resource 110 to deliver the package to a nearby store, thus minimizing the cost of delivery.

Delivery management system 106 performs the ameliorative action (step 216). In an embodiment, delivery management system 106 instructs delivery resource 110 to perform one or more ameliorative actions determined to be appropriate for the protection of the package.

In an embodiment, delivery management system 106 performs steps 202 through 214 prior to the package leaving the delivery service distribution center and proactively instructs either a worker at the distribution center or delivery resource 110 to perform one or more ameliorative actions in advance of delivery. For example, if delivery management system 106 determines the security level at the delivery location is not adequate to protect the package, then delivery management system 106 can instruct either a worker at the warehouse or delivery resource 110 to paint the package according to the determined colors of the area surrounding the delivery location, thus, decreasing the time required to deliver the package once delivery resource 110 arrives at the delivery location.

Responsive to performing the ameliorative action, or if delivery management system 106 determines the recipient is present for the delivery ("yes" branch, decision block 204), or if delivery management system 106 determines the predicted time of the recipient arrival does not exceed the pre-defined threshold ("no" branch, decision block 208), or if delivery management system 106 determines the environmental conditions do not indicate a need for ameliorative action ("no" branch, decision block 212), then delivery management system 106 delivers the package (step 218). In an embodiment, delivery management system 106 instructs delivery resource 110 to deliver the package to the designated location.

Delivery management system 106 captures an image of the package (step 220). In an embodiment, after delivery resource 110 delivers the package, delivery management system 106 captures an image of the delivered package. In an embodiment, delivery management system 106 instructs delivery resource 110 to capture an image using one or more of sensor(s) 112. In another embodiment, delivery management system 106 receives an image captured by one or more of sensor(s) 124. In an embodiment, delivery management system 106 adds highlighting and/or text to the captured image. For example, if delivery management system 106 instructed delivery resource 110 to paint the package such that the package blends into the surrounding area, then delivery management system 106 may place a border around the package or an arrow pointing to the package in the image to indicate the location of the package in the image. In another example, if delivery management system 106 instructed delivery resource 110 to place a heavy object, such as a nearby stone, on top of the package, then delivery management system 106 includes the heavy object in the captured image. In an embodiment, delivery management system 106 transmits the image to the package recipient, via delivery user interface 120. In another embodiment, delivery management system 106 transmits the image to the delivery service as evidence that the package has been delivered.

In another embodiment, delivery management system 106 may transmit a message to the recipient, via delivery user interface 120, with information and/or instructions associated with the package delivery. For example, delivery management system 106 may transmit a message that says, "Please move the stone which we used as a paper weight back to the flowerpot, opposite the elevator." In a further embodiment, delivery management system 106 may add text to the image with information and/or instructions associated with the package delivery.

Delivery management system 106 requests feedback on the delivery (step 222). In an embodiment, after the package is delivered, delivery management system 106 transmits a request to the recipient, via delivery user interface 120, for feedback regarding the package delivery. For example, delivery management system 106 transmit an email with a survey, asking whether the ameliorative actions taken was successful in protecting the package from the environmental conditions. In other examples, delivery management system 106 may transmit a text message or initiate a phone call from a chat bot to request feedback from the recipient. In an embodiment where delivery resource 110 painted the package, delivery management system 106 requests feedback on the quality of the painting, and whether the package was adequately hidden. In an embodiment, delivery management system 106 presents the request/survey in delivery user interface 120 with interactive buttons for the recipient to click on to provide answers and/or input.

Delivery management system 106 receives feedback (step 224). In an embodiment, when the package recipient responds to the request for feedback, via delivery user interface 120, delivery management system 106 receives feedback. In an embodiment, when the recipient clicks on an interactive button in a survey transmitted by delivery management system 106, then delivery management system 106 receives the feedback.

Delivery management system 106 stores the feedback (step 226). In an embodiment, when delivery management system 106 receives feedback from the recipient, i.e., the user of client computing device 118, then delivery management system 106 stores the feedback in a knowledge corpus in delivery database 108. By storing the received feedback, delivery management system 106 trains on the historical responses to improve the determination of the need for ameliorative actions as well as the performance of the ameliorative actions.

Figure 3:
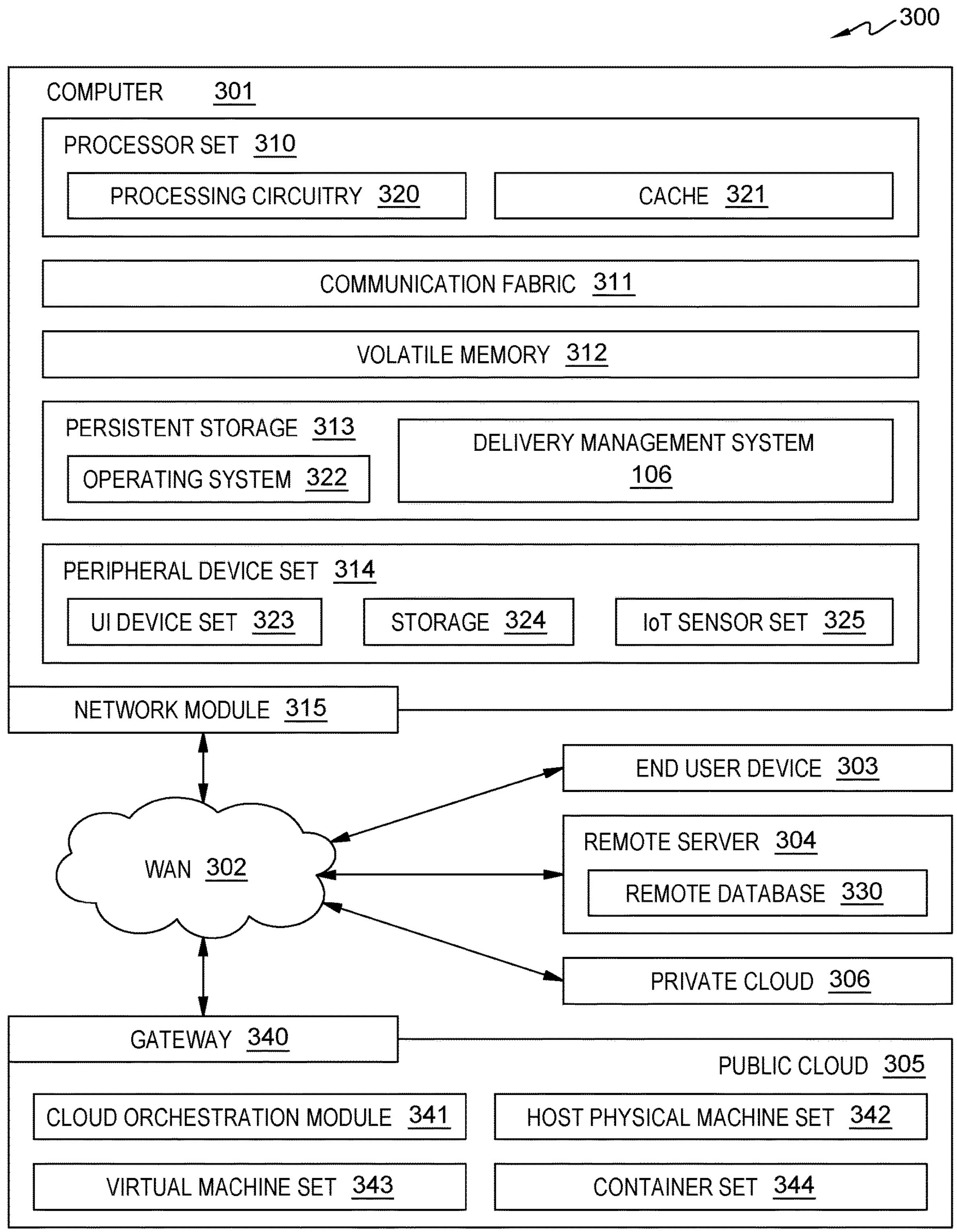
FIG. 3 illustrates an exemplary computer environment in which aspects of one or more of the illustrative embodiments may be implemented, and at least some of the computer code involved in performing the inventive methods may be executed, in accordance with an embodiment of the present invention.

FIG. 3 is an example diagram of a distributed data processing environment in which aspects of one or more of the illustrative embodiments may be implemented, and at least some of the computer code involved in performing the inventive methods may be executed, in accordance with an embodiment of the present invention, in accordance with an embodiment of the present invention. It should be appreciated that FIG. 3 provides only an illustration of one implementation and does not imply any limitations with regard to the environments in which different embodiments can be implemented. Many modifications to the depicted environment can be made.

Computing environment 300 contains an example of an environment for the execution of at least some of the computer code involved in performing the inventive methods, such as delivery management system 106 for automated protection of delivered packages. In addition to delivery management system 106, computing environment 300 includes, for example, computer 301, wide area network (WAN) 302, end user device (EUD) 303, remote server 304, public cloud 305, and private cloud 306. In this embodiment, computer 301 includes processor set 310 (including processing circuitry 320 and cache 321), communication fabric 311, volatile memory 312, persistent storage 313 (including operating system 322 and delivery management system 106, as identified above), peripheral device set 314 (including user interface (UI), device set 323, storage 324, and Internet of Things (IoT) sensor set 325), and network module 315. Remote server 304 includes remote database 330. Public cloud 305 includes gateway 340, cloud orchestration module 341, host physical machine set 342, virtual machine set 343, and container set 344.

Computer 301 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 330. As is well understood in the art of computer technology, and depending upon the technology, performance of a computer-implemented method may be distributed among multiple computers and/or between multiple locations. On the other hand, in this presentation of computing environment 300, detailed discussion is focused on a single computer, specifically computer 301, to keep the presentation as simple as possible. Computer 301 may be located in a cloud, even though it is not shown in a cloud in FIG. 3. On the other hand, computer 301 is not required to be in a cloud except to any extent as may be affirmatively indicated.

Processor set 310 includes one, or more, computer processors of any type now known or to be developed in the future. Processing circuitry 320 may be distributed over multiple packages, for example, multiple, coordinated integrated circuit chips. Processing circuitry 320 may implement multiple processor threads and/or multiple processor cores. Cache 321 is memory that is located in the processor chip package(s) and is typically used for data or code that should be available for rapid access by the threads or cores running on processor set 310. Cache memories are typically organized into multiple levels depending upon relative proximity to the processing circuitry. Alternatively, some, or all, of the cache for the processor set may be located "off chip." In some computing environments, processor set 310 may be designed for working with qubits and performing quantum computing.

Computer readable program instructions are typically loaded onto computer 301 to cause a series of operational steps to be performed by processor set 310 of computer 301 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 321 and the other storage media discussed below. The program instructions, and associated data, are accessed by processor set 310 to control and direct performance of the inventive methods. In computing environment 300, at least some of the instructions for performing the inventive methods may be stored in delivery management system 106 in persistent storage 313.

Communication fabric 311 is the signal conduction paths that allow the various components of computer 301 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 312 is any type of volatile memory now known or to be developed in the future. Examples include dynamic type random access memory (RAM) or static type RAM. Typically, the volatile memory is characterized by random access, but this is not required unless affirmatively indicated. In computer 301, the volatile memory 312 is located in a single package and is internal to computer 301, but, alternatively or additionally, the volatile memory may be distributed over multiple packages and/or located externally with respect to computer 301.

Persistent storage 313 is any form of non-volatile storage for computers that is now known or to be developed in the future. The non-volatility of this storage means that the stored data is maintained regardless of whether power is being supplied to computer 301 and/or directly to persistent storage 313. Persistent storage 313 may be a read only memory (ROM), but typically at least a portion of the persistent storage allows writing of data, deletion of data and re-writing of data. Some familiar forms of persistent storage include magnetic disks and solid-state storage devices. Operating system 322 may take several forms, such as various known proprietary operating systems or open-source Portable Operating System Interface type operating systems that employ a kernel. The code included in delivery management system 106 typically includes at least some of the computer code involved in performing the inventive methods.

Peripheral device set 314 includes the set of peripheral devices of computer 301. Data communication connections between the peripheral devices and the other components of computer 301 may be implemented in various ways, such as Bluetooth connections, Near-Field Communication (NFC) connections, connections made by cables (such as universal serial bus (USB) type cables), insertion type connections (for example, secure digital (SD) card), connections made through local area communication networks and even connections made through wide area networks such as the internet. In various embodiments, UI device set 323 may include components such as a display screen, speaker, microphone, wearable devices (such as goggles and smart watches), keyboard, mouse, printer, touchpad, game controllers, and haptic devices. Storage 324 is external storage, such as an external hard drive, or insertable storage, such as an SD card. Storage 324 may be persistent and/or volatile. In some embodiments, storage 324 may take the form of a quantum computing storage device for storing data in the form of qubits. In embodiments where computer 301 is required to have a large amount of storage (for example, where computer 301 locally stores and manages a large database) then this storage may be provided by peripheral storage devices designed for storing very large amounts of data, such as a storage area network (SAN) that is shared by multiple, geographically distributed computers. IoT sensor set 325 is made up of sensors that can be used in Internet of Things applications. For example, one sensor may be a thermometer and another sensor may be a motion detector.

Network module 315 is the collection of computer software, hardware, and firmware that allows computer 301 to communicate with other computers through WAN 302. Network module 315 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 315 are performed on the same physical hardware device. In other embodiments (for example, embodiments that utilize software-defined networking (SDN)), the control functions and the forwarding functions of network module 315 are performed on physically separate devices, such that the control functions manage several different network hardware devices. Computer readable program instructions for performing the inventive methods can typically be downloaded to computer 301 from an external computer or external storage device through a network adapter card or network interface included in network module 315.

WAN 302 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device (EUD) 303 is any computer system that is used and controlled by an end user (for example, a customer of an enterprise that operates computer 301) and may take any of the forms discussed above in connection with computer 301. EUD 303 typically receives helpful and useful data from the operations of computer 301. For example, in a hypothetical case where computer 301 is designed to provide a recommendation to an end user, this recommendation would typically be communicated from network module 315 of computer 301 through WAN 302 to EUD 303. In this way, EUD 303 can display, or otherwise present, the recommendation to an end user. In some embodiments, EUD 303 may be a client device, such as thin client, heavy client, mainframe computer, desktop computer and so on.

Remote server 304 is any computer system that serves at least some data and/or functionality to computer 301. Remote server 304 may be controlled and used by the same entity that operates computer 301. Remote server 304 represents the machine(s) that collect and store helpful and useful data for use by other computers, such as computer 301. For example, in a hypothetical case where computer 301 is designed and programmed to provide a recommendation based on historical data, then this historical data may be provided to computer 301 from remote database 330 of remote server 304.

Public cloud 305 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economics of scale. The direct and active management of the computing resources of public cloud 305 is performed by the computer hardware and/or software of cloud orchestration module 341. The computing resources provided by public cloud 305 are typically implemented by virtual computing environments that run on various computers making up the computers of host physical machine set 342, which is the universe of physical computers in and/or available to public cloud 305. The virtual computing environments (VCEs) typically take the form of virtual machines from virtual machine set 343 and/or containers from container set 344. It is understood that these VCEs may be stored as images and may be transferred among and between the various physical machine hosts, either as images or after instantiation of the VCE. Cloud orchestration module 341 manages the transfer and storage of images, deploys new instantiations of VCEs and manages active instantiations of VCE deployments. Gateway 340 is the collection of computer software, hardware, and firmware that allows public cloud 305 to communicate through WAN 302.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 306 is similar to public cloud 305, except that the computing resources are only available for use by a single enterprise. While private cloud 306 is depicted as being in communication with WAN 302, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 305 and private cloud 306 are both part of a larger hybrid cloud.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

The foregoing descriptions of the various embodiments of the present invention have been presented for purposes of illustration and example but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method comprising:

receiving, by one or more computer processors, information associated with a package delivery;

determining, by one or more computer processors, a recipient is not present for the package delivery;

predicting, by one or more computer processors, a time of arrival of the recipient, wherein the predicting comprises determining a current geolocation of the recipient via a global positioning service (GPS) sensor and determining a length of time required for the recipient to travel from the current geolocation to a delivery location of the package delivery;

determining, by one or more computer processors, a duration of time prior to the arrival of the recipient exceeds a pre-defined threshold;

determining, by one or more computer processors, one or more environmental conditions of an area surrounding the delivery location;

determining, by one or more computer processors, at least one of the one or more environmental conditions indicates a need for an ameliorative action associated with the package delivery;

determining, by one or more computer processors, one or more ameliorative actions;

instructing, by one or more computer processors, a delivery resource to print a three-dimensional (3D) object to be used in performance of the one or more ameliorative actions;

instructing, by one or more computer processors, the delivery resource to perform the one or more ameliorative actions; and instructing, by one or more computer processors, the delivery resource to deliver the package.

2. The computer-implemented method of claim 1, further comprising:

capturing, by one or more computer processors, an image of the package;

requesting, by one or more computer processors, feedback from the recipient associated with the package delivery;

receiving, by one or more computer processors, the feedback from the recipient; and storing, by one or more computer processors, the feedback.

3. The computer-implemented method of claim 1, wherein information associated with the package delivery includes at least one of: data associated with the recipient, metadata associated with the recipient, a name of the recipient, an address of the recipient, a preferred time of day for delivery, a user profile of the recipient, information about the package, a package dimension, a package size, a package shape, a package weight, a value of the package, a content of the package, and whether the package is insured.

4. The computer-implemented method of claim 1, wherein predicting the time of arrival of the recipient further includes one or more of: analyzing a calendar of the recipient, reviewing social media data associated with the recipient, analyzing one or more of an email, a text message, and a phone call of the recipient using one or more natural language processing (NLP) techniques, and analyzing historical travel patterns of the recipient.

5. The computer-implemented method of claim 1, wherein the environmental conditions include at least one of: a weather condition, a smell, a chemical presence, a stability of the delivery location, and a level of security of the delivery location.

6. The computer-implemented method of claim 1, wherein the one or more ameliorative actions include: hiding the package, moving a first object in the surrounding area to the package, printing a second object, printing a strap, printing a lock, printing a platform, printing a shelter, delivering the package under a cover, and delivering the package to a nearby store.

7. The computer-implemented method of claim 1, wherein the one or more ameliorative actions comprise painting the package, and wherein painting the package further comprises:

analyzing, by one or more computer processors, the area surrounding the delivery location; and based on the analysis, determining, by one or more computer processors, one or more colors to paint the package.

8. A computer program product comprising:

one or more non-transitory computer readable tangible storage medium;

program instructions, stored on at least one of the one or more computer readable tangible storage medium, the program instructions executable by a processor capable of performing a method, the method comprising:

receiving information associated with a package delivery:

determining a recipient is not present for the package delivery;

predicting a time of arrival of the recipient, wherein the predicting comprises determining a current geolocation of the recipient via a global positioning service (GPS) sensor and determining a length of time required for the recipient to travel from the current geolocation to a delivery location of the package delivery;

determining a duration of time prior to the arrival of the recipient exceeds a pre-defined threshold;

determining one or more environmental conditions of an area surrounding the delivery location;

determining at least one of the one or more environmental conditions indicates a need for an ameliorative action associated with the package delivery;

determining one or more ameliorative actions;

instructing, by one or more computer processors, a delivery resource to print a three-dimensional (3D) object to be used in performance of the one or more ameliorative actions;

instructing the delivery resource to perform the one or more ameliorative actions; and instructing the delivery resource to deliver the package.

9. The computer program product of claim 8, further comprising:

program instructions, stored on at least one of the one or more non-transitory computer readable tangible storage medium, to capture an image of the package;

program instructions, stored on at least one of the one or more non-transitory computer readable tangible storage medium, to request feedback from the recipient associated with the package delivery;

program instructions, stored on at least one of the one or more non-transitory computer readable tangible storage medium, to receive the feedback from the recipient; and program instructions, stored on at least one of the one or more non-transitory computer readable tangible storage medium, to store the feedback.

10. The computer program product of claim 8, wherein information associated with the package delivery includes at least one of: data associated with the recipient, metadata associated with the recipient, a name of the recipient, an address of the recipient, a preferred time of day for delivery, a user profile of the recipient, information about the package, a package dimension, a package size, a package shape, a package weight, a value of the package, a content of the package, and whether the package is insured.

11. The computer program product of claim 8, wherein predicting the time of arrival of the recipient further includes one or more of: analyzing a calendar of the recipient, reviewing social media data associated with the recipient, analyzing one or more of an email, a text message, and a phone call of the recipient using one or more natural language processing (NLP) techniques, and analyzing historical travel patterns of the recipient.

12. The computer program product of claim 8, wherein the environmental conditions include at least one of: a weather condition, a smell, a chemical presence, a stability of the delivery location, and a level of security of the delivery location.

13. The computer program product of claim 8, wherein the one or more ameliorative actions include: hiding the package, moving a first object in the surrounding area to the package, printing a second object, printing a strap, printing a lock, printing a platform, printing a shelter, delivering the package under a cover, and delivering the package to a nearby store.

14. The computer program product of claim 8, wherein the one or more ameliorative actions comprise painting the package, and wherein painting the package comprises:

program instructions, stored on at least one of the one or more non-transitory computer readable tangible storage medium, to analyze the area surrounding the delivery location; and based on the analysis, program instructions, stored on at least one of the one or more non-transitory computer readable tangible storage medium, to determine one or more colors to paint the package.

15. A computer system comprising:

one or more computer processors;

one or more computer readable memories;

one or more non-transitory computer readable tangible storage medium; and program instructions, stored on at least one of the one or more computer readable tangible storage medium for execution by at least one of the one or more computer processors via at least one of the one or more memories, wherein the computer system is capable of performing a method comprising:

receiving information associated with a package delivery;

determining a recipient is not present for the package delivery;

predicting a time of arrival of the recipient, wherein the predicting comprises determining a current geolocation of the recipient via a global positioning service (GPS) sensor and determining a length of time required for the recipient to travel from the current geolocation to a delivery location of the package delivery;

determining a duration of time prior to the arrival of the recipient exceeds a pre-defined threshold;

determining one or more environmental conditions of an area surrounding the delivery location;

determining at least one of the one or more environmental conditions indicates a need for an ameliorative action associated with the package delivery;

determining one or more ameliorative actions;

instructing, by one or more computer processors, a delivery resource to print a three-dimensional (3D) object to be used in performance of the one or more ameliorative actions;

instructing the delivery resource to perform the one or more ameliorative actions; and instructing the delivery resource to deliver the package.

16. The computer system of claim 15, further comprising:

program instructions, stored on at least one of the one or more non-transitory computer readable tangible storage medium for execution by at least one of the one or more computer processors via at least one of the one or more memories, to capture an image of the package;

program instructions, stored on at least one of the one or more non-transitory computer readable tangible storage medium for execution by at least one of the one or more computer processors via at least one of the one or more memories, to request feedback from the recipient associated with the package delivery;

program instructions, stored on at least one of the one or more non-transitory computer readable tangible storage medium for execution by at least one of the one or more computer processors via at least one of the one or more memories, to receive the feedback from the recipient; and program instructions, stored on at least one of the one or more non-transitory computer readable tangible storage medium for execution by at least one of the one or more computer processors via at least one of the one or more memories, to store the feedback.

17. The computer system of claim 15, wherein information associated with the package delivery includes at least one of: data associated with the recipient, metadata associated with the recipient, a name of the recipient, an address of the recipient, a preferred time of day for delivery, a user profile of the recipient, information about the package, a package dimension, a package size, a package shape, a package weight, a value of the package, a content of the package, and whether the package is insured.

18. The computer system of claim 15, wherein predicting the time of arrival of the recipient further includes one or more of: analyzing a calendar of the recipient, reviewing social media data associated with the recipient, analyzing one or more of an email, a text message, and a phone call of the recipient using one or more natural language processing (NLP) techniques, and analyzing historical travel patterns of the recipient.

19. The computer system of claim 15, wherein the one or more ameliorative actions include: hiding the package, moving a first object in the surrounding area to the package, printing a second object, printing a strap, printing a lock, printing a platform, printing a shelter, delivering the package under a cover, and delivering the package to a nearby store.

20. The computer system of claim 15, wherein the one or more ameliorative actions comprise painting the package, and wherein painting the package comprises:

program instructions, stored on at least one of the one or more non-transitory computer readable tangible storage medium, to analyze the area surrounding the delivery location; and based on the analysis, program instructions, stored on at least one of the one or more non-transitory computer readable tangible storage medium, to determine one or more colors to paint the package.

* * * * *